US011823203B2

(12) United States Patent
Pye

(10) Patent No.: US 11,823,203 B2
(45) Date of Patent: Nov. 21, 2023

(54) CARDHOLDER SELECTED CARD VALIDATION CODE FOR CARD-NOT-PRESENT TRANSACTIONS

(71) Applicant: Mastercard International Incorporated, Purchase, NY (US)

(72) Inventor: Rodney Victor Barlow Pye, Riverwoods, IL (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/685,446

(22) Filed: Mar. 3, 2022

(65) Prior Publication Data

US 2022/0188832 A1 Jun. 16, 2022

Related U.S. Application Data

(62) Division of application No. 16/773,609, filed on Jan. 27, 2020, now Pat. No. 11,301,863.

(51) Int. Cl.
*G06Q 20/40* (2012.01)
*G06Q 20/32* (2012.01)
(Continued)

(52) U.S. Cl.
CPC ..... *G06Q 20/4018* (2013.01); *G06Q 20/3552* (2013.01); *G06Q 20/3829* (2013.01); *G06Q 20/4016* (2013.01); *G06Q 2220/00* (2013.01)

(58) Field of Classification Search
CPC ........... G06Q 20/4018; G06Q 20/3552; G06Q 20/3829; G06Q 20/4016; G06Q 2220/00;
(Continued)

(56) References Cited

U.S. PATENT DOCUMENTS

2009/0031407 A1\* 1/2009 Kuang .................... G06F 21/31
726/7
2009/0173782 A1\* 7/2009 Muscato .......... G06Q 20/40975
235/379
(Continued)

OTHER PUBLICATIONS

A. Ansari, "The Logic Behind a 16 Digit Credit Card Number," Oct. 31, 2018, retrieved from: https://www.zeolearn.com/magazine/logic-of-credit-card-number (Year: 2018).\*
(Continued)

*Primary Examiner* — Daniel S Felten
*Assistant Examiner* — Douglas W Pinsky
(74) *Attorney, Agent, or Firm* — Hovey Williams LLP

(57) ABSTRACT

Systems and methods for managing a user-selected card verification code (CVC2) value for a payment card are disclosed. A sever is coupled to a payment card database and a hardware security module. The server is programmed to receive a request from a user to change the CVC2 value of the payment card to the user-selected CVC2 value. Based upon the request, the server retrieves from a payment card table stored on the database a payment card record associated with the payment card. The server transmits the user-selected CVC2 value, and, from the payment card record, a primary account number, a payment card expiry date, and a first service code to a hardware security module. The server subsequently receives from the hardware security module a second service code associated with the user-selected CVC2 value. The server updates the first service code in the payment card record to the second service code.

15 Claims, 7 Drawing Sheets

(51) Int. Cl.
*G06Q 20/38* (2012.01)
*H04L 29/06* (2006.01)
*G06Q 50/00* (2012.01)
*G06F 16/28* (2019.01)
*G06Q 20/34* (2012.01)

(58) Field of Classification Search
CPC ............ G06Q 20/409; G06Q 20/3821; G06Q 20/3265; G06Q 20/3555
See application file for complete search history.

(56) References Cited

U.S. PATENT DOCUMENTS

| | | | | |
|---|---|---|---|---|
| 2010/0258625 | A1* | 10/2010 | Stanfield | G07F 7/10 235/380 |
| 2013/0054474 | A1* | 2/2013 | Yeager | G06Q 20/40975 705/71 |
| 2013/0268775 | A1* | 10/2013 | Hawkins | H04L 9/0872 713/189 |
| 2014/0122331 | A1* | 5/2014 | Vaish | G06Q 20/3674 705/41 |
| 2015/0310439 | A1* | 10/2015 | Powell | G06Q 20/409 705/44 |

OTHER PUBLICATIONS

E. Gehringer, "Choosing Passwords: Security and Human Factors," 2002, IEEE 2002 International Symposium on Technology and Society (ISTAS'02). Social Implications of Information and Communication Technology. Proceedings (Cat. No. 02CH37293) (pp. 369-373) (Year: 2002).*

* cited by examiner

US 11,823,203 B2

CARDHOLDER SELECTED CARD VALIDATION CODE FOR CARD-NOT-PRESENT TRANSACTIONS

CROSS-REFERENCE TO RELATED APPLICATIONS

This application is a divisional application of identically titled U.S. patent application Ser. No. 16/773,609 filed Jan. 27, 2020, which is incorporated herein by reference in its entirety.

FIELD OF THE DISCLOSURE

The field of the disclosure relates generally to electronic commerce and, more particularly, to payment cards for use in electronic payment systems.

BACKGROUND

Typically, one of the concerns of merchants and/or payment card issuers is the payment transaction where the cardholder is not physically present at the time the payment transaction is being performed. Thus, the merchant and/or the payment card issuer cannot determine whether the payment transaction is being initiated by an authorized or unauthorized cardholder. Such transactions are generally referred to as card-not-present (CNP) transactions. CNP transactions may include, for example, e-commerce or on-line purchases; telephone, fax, and mail order transactions; purchases made via merchant applications running on an electronic device; and other Internet related transactions.

Generally, to complete a CNP transaction, a cardholder is asked to provide the payment card number, the expiry date, and the card verification code (CVC2) value printed on the payment card. The CVC2 value is a static value printed on the payment card and visible to others. Supplying the CVC2 value in a CNP transaction is intended to verify that the cardholder possess the payment card, therefore decreasing the likelihood of fraudulent use. However, a fraudster that has access to a payment card may copy the account number, the expiry date, and the CVC2 value, thereby enabling the fraudster to perform CNP transactions.

In such instances, after it has been determined that the static CVC2 value of a payment card may have been compromised, a replacement payment card is typically issued with a new card number and/or a new expiry date to prevent further fraudulent transactions using the compromised payment card. The cost of the replacement payment card is generally borne by the payment card issuer. As such, if a large number of cardholders are affected by a security breach, the cost of replacing the affected payment cards can be substantial. Moreover, because the cost of replacing a chip card is significantly greater than the cost of replacing a magnetic stripe card, the cost associated with issuing replacement cards has increased dramatically as the use of chip cards increases.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a system that manages a user-selected card verification code (CVC2) value for a payment card associated with a user is provided. The system includes a database, a hardware security module (HSM), and a server coupled to the database and the HSM. The database includes a payment card table, which includes a payment card record associated with the payment card. The payment card record includes a primary account number (PAN), a payment card expiry date, and a first service code. The HSM includes one or more cryptographic keys associated with the payment card. The HSM is operable to receive the user-selected CVC2 value, the PAN, the payment card expiry date, and the first service code, and to transmit a second service code based upon the user-selected CVC2 value. The server includes a processor programmed to receive a request from the user to change a first CVC2 value associated with the payment card to the user-selected CVC2 value. The request includes the user-selected CVC2 value. Furthermore, the processor is programmed to retrieve from the payment card table the payment card record associated with the payment card and to transmit the user-selected CVC2 value, the PAN, the payment card expiry date, and the first service code to the HSM. Moreover, the processor is programmed to receive from the hardware security module the second service code, and to update the first service code in the payment card record to the second service code.

In another aspect, a method for managing a user-selected card verification code (CVC2) value for a payment card associated with a user is provided. The method includes receiving a request from the user to change a first CVC2 value associated with the payment card to the user-selected CVC2 value, where the request includes the user-selected CVC2 value. The method also includes, based upon the request, retrieving from a payment card table a payment card record associated with the payment card. The payment card record includes a primary account number (PAN), a payment card expiry date, and a first service code. In addition, the method includes transmitting the user-selected CVC2 value, the PAN, the payment card expiry date, and the first service code to a hardware security module (HSM), and subsequently receiving from the HSM a second service code, where the second service code is different than the first service code. Moreover, the method includes updating the first service code in the payment card record to the second service code.

In yet another aspect, a method for managing a user-selected card verification code (CVC2) value for a payment card associated with a user is provided. The method includes receiving a request from the user to change a first CVC2 value associated with the payment card to the user-selected CVC2 value. The method also includes, based upon the request, retrieving from a payment card table a payment card record associated with the payment card. The payment card record includes a primary account number (PAN), a payment card expiry date, and a first service code. In addition, the method includes generating a plurality of second service codes and transmitting the PAN, the payment card expiry date, and the plurality of second service codes to a hardware security module (HSM). Furthermore, the method includes receiving from the HSM a plurality of second CVC2 values, where each if the second CVC2 values is different than the first CVC2 value and is associated with a respective one of the second service codes. Moreover, the method includes presenting to the user the plurality of second CVC2 values, and subsequently receiving, from the user, a selection of one of the plurality of second CVC2 values, where the selected second CVC2 value is the user-selected CVC2 value. The method also includes updating the first service code in the payment card record to the second service code associated with the user-selected CVC2 value.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
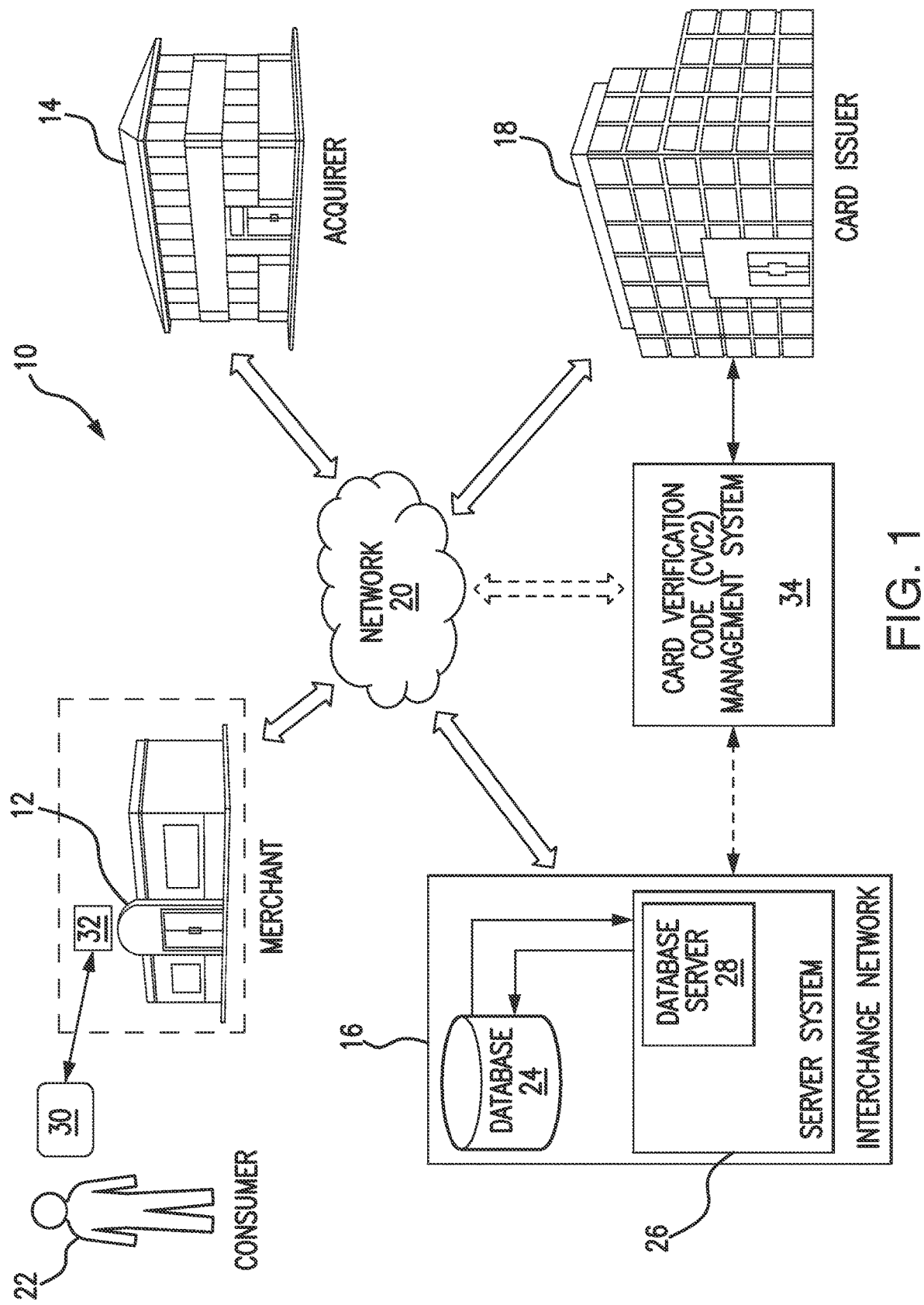
FIG. 1 is a block diagram illustrating an example multi-party payment card network system, in accordance with one embodiment of the disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled. It is contemplated that the disclosure has general application to managing a card verification code of a payment card in industrial, commercial, and residential applications.

The terms "payment card," "transaction card," "card," and the like, as used herein, includes a payment card that can be presented by a cardholder to make a payment or that can be used by the cardholder to make a payment in a remote transaction, such as an e-commerce transaction, telephone transaction, or mail order transaction. For example, and without limitation, the payment cards described herein include credit cards, debit cards, charge cards, stored-value cards, and/or prepaid cards.

A "remote transaction," such as an e-commerce transaction, telephone transaction, and mail order transaction, includes a payment transaction in which the payment card is not presented directly to a merchant during the transaction. Such remote transactions are also referred to herein as card-not-present (CNP) transactions. It is noted that CNP transactions are vulnerable to fraud by unauthorized users (e.g., fraudsters) who have access to cardholder account information.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle© Database (Oracle is a registered trademark of Oracle Corporation, Redwood Shores, Calif.), MySQL, IBM© DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL. However, any database may be used that enables the systems and methods to operate as described herein.

A Card Security Code (CSC), which may be referred to as a Card Verification Value (CVV or CVV2), Card Verification Value Code (CVVC), Card Verification Code (CVC), Verification Code (V-Code or V Code), or Card Code Verification (CCV) value is a security feature used in payment card transactions for providing increased protection against payment card fraud. Several types of CSC's have been implemented for payment cards. For example, a first type of CSC, such as a CVC1 or CVV1, is encoded on the magnetic stripe of a payment card and is used in card present transactions. A second type of CSC, such as a CVC2, CVV2, or card identification number "CID," is typically requested by a merchant in a CNP transaction. For ease of understanding, the base CVC designation will be used herein when referring to a card security code.

A CVC2 value is a three (3) or four (4) digit number that is printed on a payment card, often on the signature strip, but which is not encoded on the magnetic stripe. Mastercard© branded payment cards, for example, include a three (3) digit code. (Mastercard is a registered trademark of Mastercard International Incorporated.) The CVC2 is typically not embossed like the primary account number (PAN) and is typically the final group of numbers printed on the back signature panel of the card. In some applications, the CVC2 appears in a separate panel located to the right of the signature strip. A CVC2 value is typically generated when the payment card is issued by concatenating the PAN, the payment card expiry date, and a service code and hashing under a cryptographic key or keys known only to the issuing bank. The service code, by default, includes all zero (0) values (e.g., 000 or 0000). Based upon these three (3) inputs and the additional cryptographic keys, the algorithm calculates a resultant ciphertext wherein a portion of the ciphertext is used as the CVC2 value that is printed on the payment card.

When performing a CNP transaction, a cardholder is asked to provide the PAN, the payment card expiry date, and the CVC2 value. Supplying the CVC2 value during a CNP transaction is intended to verify that the consumer performing the CNP transaction has the payment card in their possession. While providing the CVC2 is not proof that the consumer has possession of the payment card, knowledge of the CVC2 value demonstrates that the consumer has seen the payment card or has seen a record made by somebody who saw the payment card.

Embodiments of the present technology relate to systems, methods, and computer-readable media for managing a user-selected CVC2 value for a payment card associated with a user or cardholder. Embodiments of the present technology reduce the risk of fraudulent use of a lost or stolen payment card during a CNP transaction by enabling a user or cardholder to select or otherwise change the CVC2 value printed on a physical payment card to a value of their choosing.

According to one embodiment of the disclosure, a computing system is configured to receive a request from the user to change the CVC2 value associated with the payment card to the user-selected CVC2 value. Generally, the user may submit such a request via a card issuer's website or mobile application (App). As such, a user is typically authenticated during a sign-in process to the website or App. After signing in and being authenticated, the user may submit the request, indicating the new CVC2 value the user wishes to use.

After receiving the user request, the card issuer retrieves, from a payment card table stored in a database, a payment card record that is associated with the user's payment card. The payment card record includes at least the user's PAN, an expiry date of the payment card, and a service code. Typically, a payment card record does not include a service code. However, the embodiments described herein provide for an improved payment card record that includes at least one service code field with a service code value stored therein. As described above, the service code is typically a three (3) or four (4) digit code selected by the card issuer. In many instances, a card issuer uses the default service code of zero (0) values, although this is not a requirement. The card issuer transmits the user-selected CVC2 value, the PAN, the payment card expiry date, and the service code to a hardware security module (HSM).

The HSM is a secure server that stores private cryptographic keys and code generation algorithms thereon and performs various code generation or cryptographic processes. Using the data received from the card issuer and the private cryptographic keys, the HSM determines a new service code that can be used to generate the user-selected CVC2 value. This service code is transmitted back to the card issuer, which then writes the new service code to the payment card record. As such, future CNP transactions performed by the card holder will require the input of the user-selected CVC2 value rather than the CVC2 value printed on the payment card. This facilitates preventing the fraudulent use of a stolen or lost payment card for CNP transactions or other transactions requiring the CVC2 as part of the transaction.

The methods and systems described herein may be implemented using computer programming or engineering techniques including computer software, firmware, hardware, or any combination or subset therefor. At least one of the technical problems addressed by this system includes enabling a card issuer to change or modify CVC2 values for a payment card, based upon a user's selection, without issuing a new payment card.

A technical effect of the systems and methods described herein is achieved by performing at least one of the following operations: (i) receiving a request from the user to change a first CVC2 value associated with the payment card to the user-selected CVC2 value; (ii) based upon the request, retrieving from a payment card table a payment card record associated with the payment card, the payment card record comprising a primary account number, a payment card expiry date, and a first service code; (iii) transmitting the user-selected CVC2 value, the primary account number, the payment card expiry date, and the first service code to a hardware security module; (iv) receiving from the hardware security module a second service code, the second service code different than the first service code; and (v) updating the first service code in the payment card record to the second service code.

The resulting technical effect achieved by the systems and methods described herein is at least one of: (i) modifying payment card record data to reflect a user-selected data value that is typically unchangeable by a user; (ii) reducing the risk of a fraudulent CNP transaction being performed using a lost or stolen payment card; and (iii) reducing the costs to a card issuer by limiting manufacturing and distribution of payment cards.

As will be appreciated, based upon the description herein, the technical improvement in enabling a user to change his or her CVC2 for a payment card as described is a computer-based solution to a technical deficiency or problem that is itself rooted in computer technology (i.e., the problem itself derives from the use of computer technology). More specifically, the technical problems and inefficiencies created by conventional hard coding of a CVC2 value using encryption processes are the result of an implementation and use of computers in those CVC2 value determination systems and methods. The present disclosure improves upon the conventional methods and systems in the manners described herein. Thus, the inefficiencies or technical problems created by the CVC2 value determination systems and methods as described herein are solved by the methods and systems described and particularly claimed.

FIG. 1 is a block diagram illustrating an example multi-party payment card network system 10, in accordance with one embodiment of the present disclosure. The example payment card network system 10 generally includes merchants 12, acquirers 14, an interchange network 16, and card issuers 18, coupled in communication via a network 20. As used herein, the term "interchange network" includes an electronic network that exchanges data relating to the value of card sales and credits among the issuers 18 and the acquirers 14 (e.g., networks maintained, for example, by Mastercard, etc.)

The payment card network system 10 facilitates providing interchange network services offered by the interchange network 16. In addition, the payment card network system 10 enables payment card transactions in which the merchants 12, acquirers 14, and/or card issuers 18 do not need to have a one-to-one relationship. As an example, the payment card network system 10 may be utilized by the merchants 12 as part of a process of initiating a pre-authorization request for performing a transaction (as described herein). Although parts of the payment card network system 10 are presented in one arrangement, other embodiments may include the same or different parts arranged otherwise, depending, for example, on pre-authorization processes for purchase transactions, communication between computing devices, etc.

The network 20 includes, for example and without limitation, one or more of a local area network (LAN), a wide area network (WAN) (e.g., the Internet, etc.), a mobile network, a virtual network, and/or any other suitable public and/or private network capable of facilitating communication among the merchants 12, the acquirers 14, the interchange network 16, the issuers 18, and/or a cardholder or cardholder 22. Additionally, the network 20 may include more than one type of network, such as a private payment transaction network provided by the interchange network 16 to the acquirers 14 and/or the issuers 18, and separately, the public Internet, which may facilitate communication between the merchants 12, the interchange network 16, the acquirers 14, and/or the cardholders 22 (also referred to herein as a "user").

Embodiments described herein may relate to a payment card system, such as a credit card payment system using the Mastercard interchange network. The Mastercard interchange network is a set of proprietary communications standards promulgated by Mastercard for the exchange of financial transaction data and the settlement of funds between financial institutions that are members of Mastercard. As used herein, financial transaction data includes a unique account number associated with an account holder using a payment card issued by an issuer, purchase data representing a purchase made by the consumer, including a type of merchant, amount of purchase, date of purchase, and other data, which may be transmitted between any parties of multi-party payment card network system 10.

In a typical payment card system, a financial institution called the "issuer" issues a payment card 30, such as a debit card, to the user or cardholder 22, who uses the payment card 30 to tender payment for a purchase from the merchant 12. The merchant 12 is typically associated with products, for example, and without limitation, goods and/or services, that are offered for sale and are sold to the cardholders 22. The merchant 12 includes, for example, a physical location and/or a virtual location. A physical location includes, for example, a brick-and-mortar store, etc., and a virtual location includes, for example, an Internet-based store-front.

To accept payment with the payment card 30, the merchant 12 must normally establish an account with a financial institution that is part of the payment card network system 10. This financial institution is usually called the "merchant bank," the "acquiring bank," or the acquirer 14.

When the cardholder 22 provides payment for a purchase with the payment card 30, the merchant 12 requests authorization from the acquirer 14 for the purchase amount. The request may be performed over the telephone but is usually performed using a point-of-sale (POS) terminal, such as POS terminal 32, that reads the consumer's account information (such as a primary account number (PAN)) from a magnetic stripe, a chip, or embossed characters on the payment card 30 and communicates electronically with the transaction processing computers of the acquirer 14. In CNP transactions, the PAN, a CVC2 value, and a payment card expiry date are customarily provided to the merchant by the cardholder 22. In some embodiments, the acquirer 14 may authorize a third party to perform transaction processing on its behalf. In this case, the POS terminal 32 will be configured to communicate with the third party. Such a third party is usually called a "merchant processor," an "acquiring processor," or a "third party processor."

Using the interchange network 16, computers of the acquirer 14 or merchant processor communicate the authorization request to computers of the issuer 18 to determine whether the transaction should be approved. As part of the determination, the issuer 18 validates the payment card 30 using the supplied CVC2 value. The payment card information is transmitted to a card verification code (CVC2) management system 34. The CVC2 management system 34 can be a hardware/software system at an issuer 18 or a separate system coupled in communication with the card issuer 18. The CVC2 management system 34 uses the payment card information supplied by the cardholder 22 or merchant 12, a service code provided by the issuer 18, and one or more cryptographic keys to calculate a CVC2 value, which is then compared to the supplied CVC2, to determine of the payment card 30 is valid. The issuer also determines whether the consumer's account linked to the PAN is in good standing and whether the purchase transaction is covered by the consumer's available funds or available credit line. Based upon these determinations, the request for authorization will be declined or accepted. If the request is accepted, an authorization code is issued to the acquirer 14 and the merchant 12 for the amount of the transaction or the requested estimated amount.

When a request for authorization is accepted, the available funds or a credit line of the cardholder's account is decreased. Normally, a charge for a payment card transaction is not posted immediately to the cardholder's account because bankcard associations, such as Mastercard, have promulgated rules that do not allow the merchant 12 to charge, or "capture," a transaction until the purchased goods are shipped or the purchased services are delivered. However, with respect to at least some debit card transactions, a charge may be posted at the time of the transaction. When the merchant 12 ships or delivers the goods or services, the merchant 12 captures the transaction by, for example, appropriate data entry procedures on the point-of-sale terminal. This may include bundling of approved transactions daily for standard retail purchases. If the cardholder 22 cancels a transaction before it is captured, a "void" is generated. If the cardholder 22 returns goods after the transaction has been captured, a "credit" is generated. In some instances, if the cardholder 22 did not authorize the transaction, such as a previously cancelled recurring payment or a card-not-present (CNP) account-on-file transaction, a "chargeback" is generated. The interchange network 16 and/or the issuer 18 stores the transaction data, such as, and without limitation, the PAN and expiry date of the payment card 30, a type of merchant, a merchant identifier, a location where the transaction was performed, a dollar amount of the transaction, a merchant category code, a date and time of the transaction, products purchased and related descriptions or identifiers, etc., in a transaction database 24.

After the transaction has been authorized, a clearing process occurs to transfer additional transaction data related to the transaction among the parties to the transaction, such as the acquirer 14 and the issuer 18. More specifically, during and/or after the clearing process, additional data, such as a time of purchase, a merchant name, a type of merchant, purchase information, consumer account information, a type of transaction, itinerary information, information regarding the purchased item and/or service, and/or other suitable information, is associated with the transaction and transmitted between parties to the transaction as transaction data, and may be stored by any of the parties to the transaction.

While only one merchant 12, acquirer 14, interchange network 16, and issuer 18 are shown in FIG. 1 (for ease of reference), it should be appreciated that a variety of other embodiments may include multiple ones of these parts in various combinations.

Figure 2:
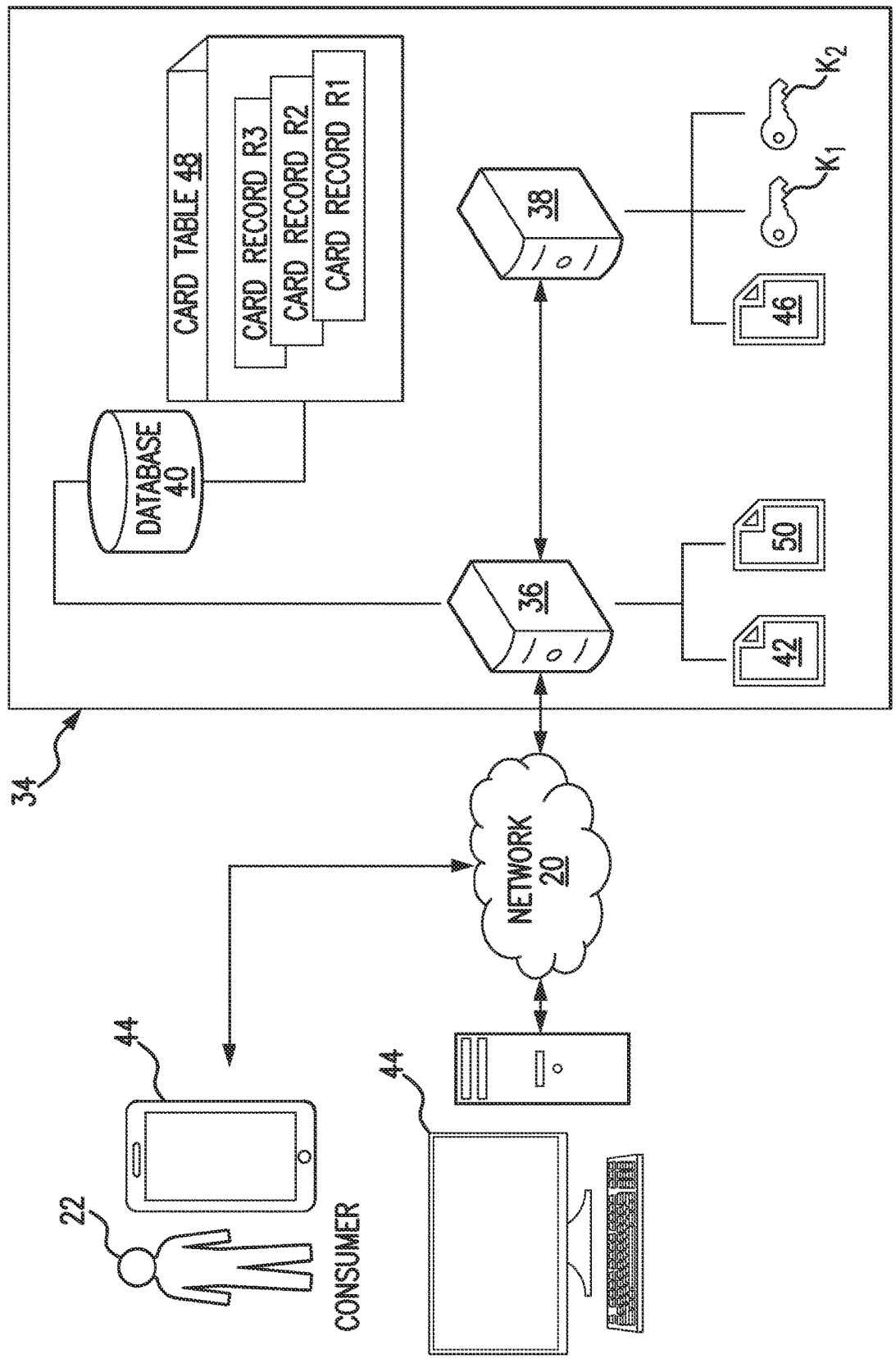
FIG. 2 is a block diagram illustrating an example card verification code (CVC2) management system of the multi-party payment card network system shown in FIG. 1.

FIG. 2 is a block diagram illustrating an example card verification code (CVC2) management system 34, according to one embodiment of the present disclosure. As described above, the CVC2 management system 34 can be a hardware/software system that is part of the issuer 18 or a separate system coupled in communication with the card issuer 18 and, optionally, the interchange network 16, via the network 20. In some embodiments, not only can the CVC2 management system 34 be part of the issuer 18, if the issuer provides or shares its secret cryptographic keys $K_1$ and $K_2$ with the interchange network 16, a second CVC2 management system 34 may be part of the interchange network 16.

The CVC2 management system 34 includes a CVC2 management server 36 coupled to a hardware security module (HSM) 38, the network 20, and a payment card database 40. The CVC2 management server 36 includes a CVC2 select application 42 and a pseudo-random number generator application 50 running thereon. The CVC2 select application 42 and the pseudo-random number generator application 50 are software components stored in a storage device 410 (shown in FIG. 4) of the CVC2 management server 36 and are configured to be executed by a processor 402 (shown in FIG. 4). Generally, the CVC2 select application 42 includes one or more application programming interfaces (APIs) that interacts with the cardholder 22 via a user interface (not shown) provided by one or more of a web application, a mobile application, and/or an interactive voice response (IVR) application. For example, and without limitation, the user interface may be provided by the CVC2 management server 36 to a user computing device 44 (e.g., a smartphone, a computer, and the like). It is noted that the user computing device 44 can include any computing device that is in communication with the CVC2 management server 36 and that is accessible by the cardholder 22, including, for example, a mobile computing device, a personal computer, an automated teller machine (ATM), an interactive teller machine (ITM), a kiosk, and the like. The CVC2 select application 42 is further configured to interact with the HSM 38. Generally, the pseudo-random number generator application 50 is an application containing an algorithm for generating a sequence of numbers whose properties approximate the properties of sequences of random numbers, such as random service codes for use in calculating CVC2 values.

In general, the HSM 38 is a trusted network computing device that performs a variety of cryptographic operations, including, for example, key management, key exchange, encryption, decryption, and the like. The HSM 38 includes one or more cryptographic keys, such as the cryptographic keys $K_1$ and $K_2$, and a code generation algorithm 46 stored in a storage device 410. It is noted that, in the exemplary embodiment, the code generation algorithm 46 is a reversible code generation algorithm.

The HSM 38 also includes a cryptographic processor 402 for executing the code generation algorithm and performing the variety of cryptographic operations. In the exemplary embodiment, the HSM 38 provides a secure platform to at least generate, store, and protect the cryptographic keys $K_1$ and $K_2$. The HSM 38 also provides a secure platform to encrypt and decrypt payment card information, such as a CVC2 value associated with the payment card 30. The HSM 38 may include software code and/or hardware modules that allow the HSM 38 to interact with the CVC2 select application 42.

The payment card database 40 includes at least one payment card table, such as the payment card table 48. The payment card table 48 includes, for example, a plurality of rows or payment card records, such as payment card records $R_1$, $R_2$, $R_3$. Each of the payment card records $R_1$, $R_2$, $R_3$ is associated with a respective payment card and includes, for example, a plurality of data fields (e.g., columns of the table). The data fields include, for example, and without limitation, at least a field for a unique PAN, a field for an expiry date associated with the respective payment card, a field for an active or current service code (also referred to herein as a first service code), and a field for a default or original service code. See Table 1 below.

TABLE 1

| | Primary Account Number (PAN) | Expiry Date | Active Service Code | Default Service Code |
|---|---|---|---|---|
| $R_1$ | 5123456789012345 | March 2023 | 000 | 000 |
| $R_2$ | 5234567890123456 | August 2021 | 001 | 000 |
| $R_3$ | 5567890123456789 | May 2023 | 002 | 000 |

As described above, the embodiments described herein provide for an improved payment card record that includes a service code field(s) with a service code value stored therein. The new service code fields allow the cardholder 22 to select a CVC2 of their choosing, thereby providing additional security to the payment card 30 against fraudulent use, as the printed CVC2 will not be valid for performing CNP transactions. Including the service code fields in the payment card records $R_1$, $R_2$, $R_3$ enables the issuer 18, the interchange network 16, and/or a separate processor operating the CVC2 management system 34 to verify the user-supplied CVC2 value during a CNP transaction.

Referring to Table 1, the value stored in the Active Service Code data field may be used along with the PAN and expiry date to calculate the active CVC2 value for the respective payment card, such as the payment card 30. The value stored in the Default Service Code data field may be written to the Active Service Code data field to reset the CVC2 value to the original value printed on the payment card 30. By maintaining a record of the default service code, the payment card record may be returned to its original state should a cardholder 22 forget the user-selected CVC2 value or otherwise need to return the CVC2 value to the value printed on the payment card 30.

In one embodiment, when a payment card 30 is issued, a default CVC2 value is calculated and the Active Service Code and Default Service Code data fields each contain the default service code value, which is typically all zeros (000 or 0000). However, when a cardholder, such as the cardholder 22, chooses to change the CVC2 value to a user-selected CVC2 value, the Active Service Code data field is populated with a non-zero service code value. The non-zero service code value is calculated by the HSM 38 based upon the user-selected CVC2 value, the PAN, and the expiry date of the payment card 30.

When the cardholder 22 chooses to reset the CVC2 value to its original value, such as when the cardholder forgets the user-selected CVC2 value, the value stored in the Default Service Code data field is copied to the Active Service Code data field. This allows the payment card 30 to be used with the CVC2 value printed on the payment card 30 for CNP transactions.

Exemplary Computer Systems

Figure 3:
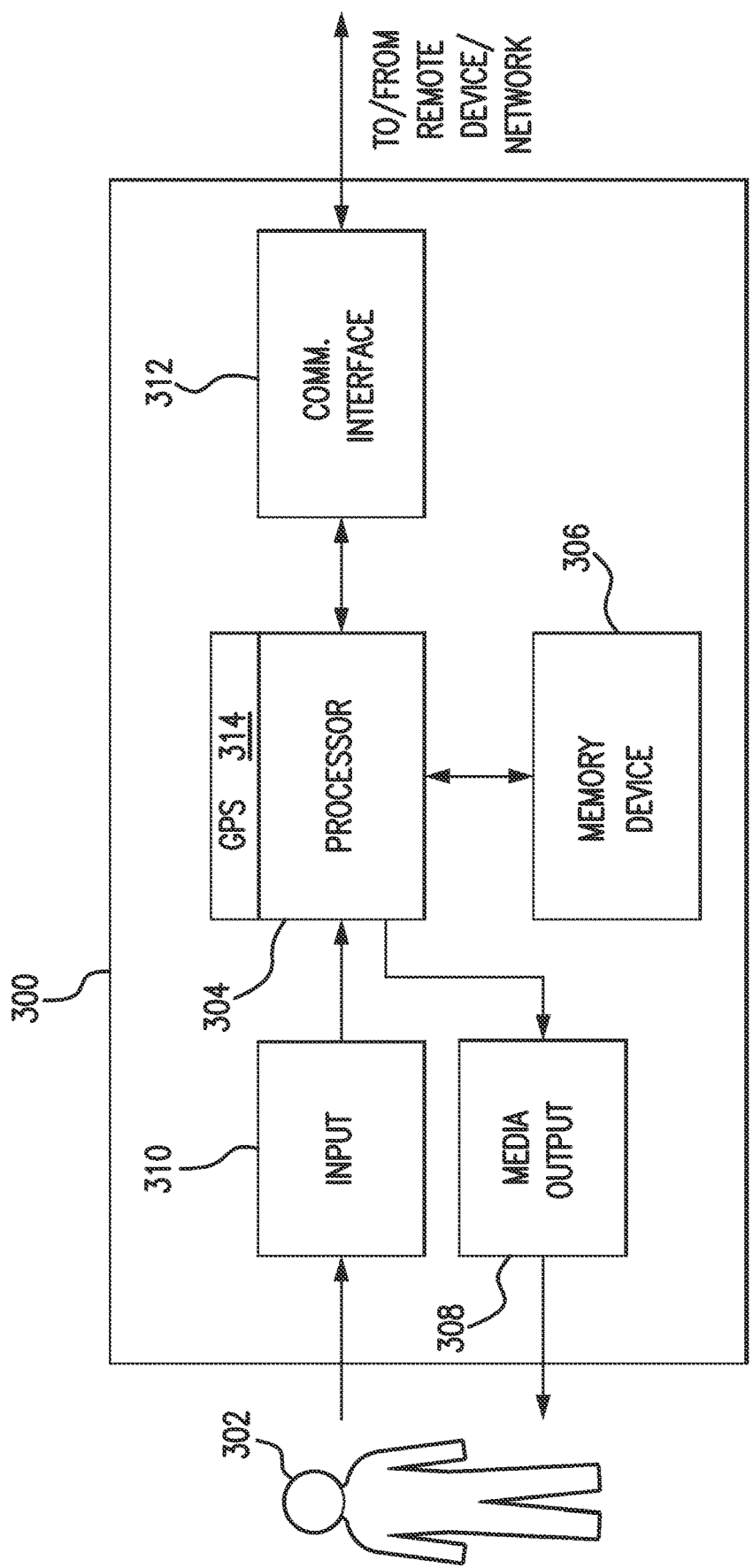
FIG. 3 is an example configuration of a computer system operated by a user, such as the user computing device shown in FIG. 2.

FIG. 3 is an example configuration of a computer system 300 operated by a user 302, such as the cardholder 22 (shown in FIG. 1). In embodiments, the computer system 300 is a user computing device 44 (shown in FIG. 2). In the example embodiment, the computer system 300 includes a processor 304 for executing instructions. In some embodiments, executable instructions are stored in a memory device 306. The processor 304 includes one or more processing units, for example, in a multi-core configuration. The memory device 306 is any device allowing information, such as transaction information, executable instructions, and/or written works, to be stored and retrieved. The memory device 306 includes one or more computer readable media.

A location of the computer system 300 can be obtained through various methods, such as a location service (e.g., global positioning system (GPS) service) in the computer system 300, "ping" data that includes geotemporal data, from cell location register information held by a telecommunications provider to which the computer system 300 is connected, IP address register information, and the like. For example, in one suitable embodiment, a GPS component 314 may be part of or separate from the processor 304 to enable the location of the computer system 300 to be determined.

The computer system 300 also includes at least one media output component 308 for presenting information to the user 302. The media output component 308 is any component capable of conveying information to the user 302. In some embodiments, the media output component 308 includes an output adapter such as a video adapter and/or an audio adapter. An output adapter is operatively coupled to the processor 304 and operatively connectable to an output device such as a display device, a liquid crystal display (LCD), organic light emitting diode (OLED) display, or "electronic ink" display, or an audio output device, a speaker, or headphones.

In some embodiments, the computer system 300 includes an input device 310 for receiving input from the user 302. The input device 310 may include, for example, a touch sensitive panel, a payment card scanner/reader, a touch pad, a touch screen, a stylus, a gyroscope, an accelerometer, a position detector, a keyboard, a pointing device, a mouse, or an audio input device. A single component such as a touch screen may function as both an output device of a media output component 308 and the input device 310. The computer system 300 may also include a communication interface 312 (e.g., a network interface), which is communicatively connectable to a remote device such as the merchant 12, the interchange network 16, the issuer 18, and the CVC2 management system 34 (each shown in FIG. 1). The communication interface 312 may include, for example, and without limitation, a wired or wireless network adapter or a wireless data transceiver for use with Bluetooth communication, radio frequency communication, near field communication (NFC), and/or a mobile phone network, such as Global System for Mobile communications (GSM), 3G, 4G, 4G Long Term Evolution (LTE), 5G Voice over LTE (VoLTE), or any other mobile data network, and/or Worldwide Interoperability for Microwave Access (WiMax), and the like.

Stored in the memory device 306 are, for example, computer readable instructions for providing a user interface to the user 302 via the media output component 308 and, optionally, receiving and processing input from the input device 310. A user interface may include, among other possibilities, a web browser and/or a client application. Web browsers and/or client applications generally enable users, such as the user 302, to display and interact with media and other information typically embedded on a web page or a website available, for example, from the issuer 18.

In the example embodiment, the computing system 300 is a user computing device 44 from which the cardholder 22 engages with an interchange network (e.g., the interchange network 16 shown in FIG. 1), a network (e.g., the network 20 shown in FIG. 1), and an issuer of a payment card (e.g., the issuer 18 shown in FIG. 1) to perform payment transactions and/or execute changes to the cardholder's payment card CVC2 value.

Figure 4:
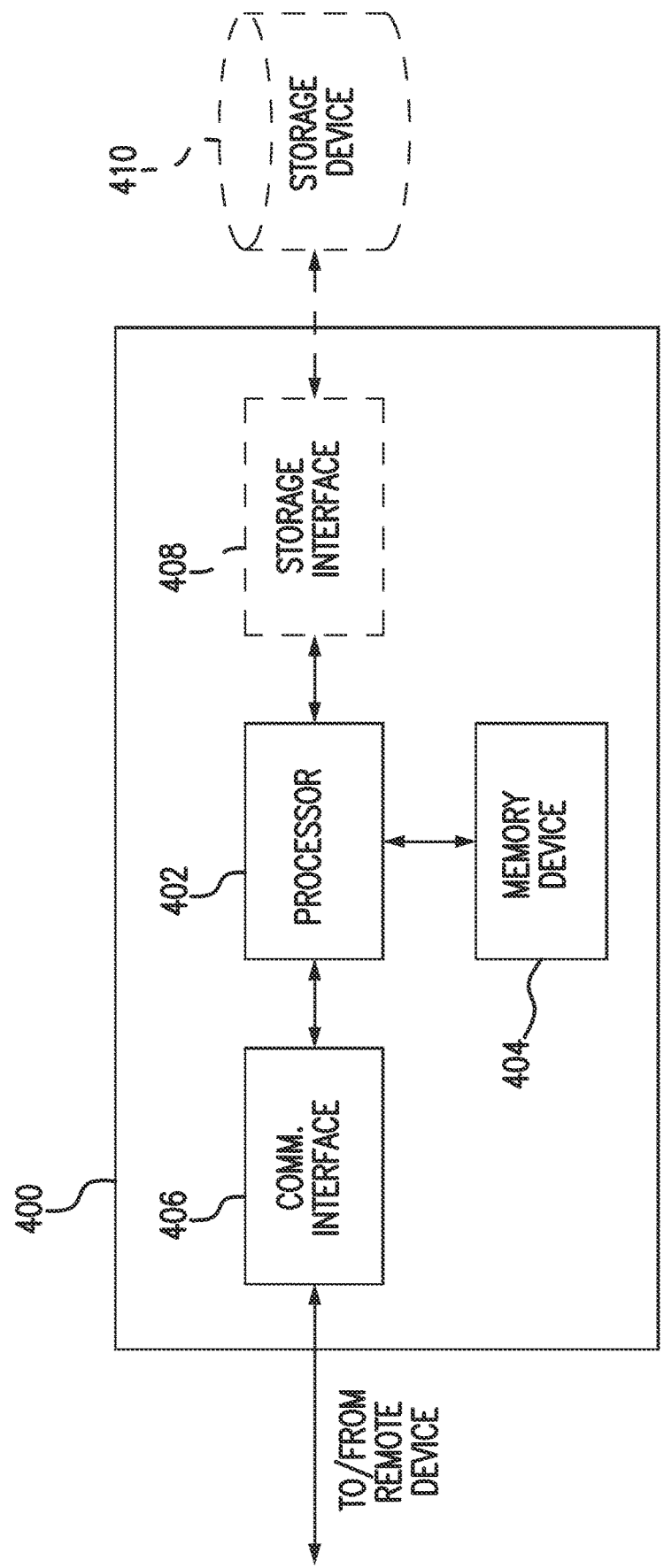
FIG. 4 is an example configuration of a server system, such as the server system shown in FIG. 1, the CVC2 management server shown in FIG. 2, and/or the hardware security module (HSM) shown in FIG. 2.

FIG. 4 is an example configuration of a server system 400, such as the server system 26 (shown in FIG. 1), the CVC2 management server 36 (shown in FIG. 2), and/or the HSM 38 (shown in FIG. 2). The server system 400 includes, but is not limited to, a database server, such as the database server 28 (shown in FIG. 1), and is coupled to, for example, one or more databases, such as the transaction database 24 (shown in FIG. 1) or the payment card database 40 (shown in FIG. 2). In the example embodiment, the server system 400 includes a processor 402 for executing instructions. The instructions may be stored in a memory device 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

In one example embodiment, the processor 402 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

The processor 402 is operatively coupled to a communication interface 406 (e.g., a network interface) such that the server system 400 can communicate with a remote device such as a computer system 300 (shown in FIG. 3) or another server system 400. For example, the communication interface 406 may receive communications from the merchant POS terminal 32 and/or the user computing device 44 via the Internet, as illustrated in FIGS. 1-3.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is similar to the storage devices of databases 24 and 40, as described above. For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory device 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In the example embodiment, the server system 400 is representative of the server system 26, the CVC2 management server 36, and the HSM 38. The server system 26 is a transaction verification and processing system in communication with one or more of the issuer 18 and the merchant 12 during a payment card transaction associated with a user, such as the cardholder 22. The CVC2 management server 36 is a cardholder interface system in communication with one or more of the interchange network 16, the issuer 18, and/or the cardholder 22 during a card verification process and/or a CVC2 value change request. The HSM 38 is a trusted, secure cryptography system that performs encryption and decryption operations to calculate CVC2 values from inputs received from one or more of the cardholder 22, the issuer 18, and/or the interchange network 16.

Exemplary Computer-Implemented Methods

Figure 5:
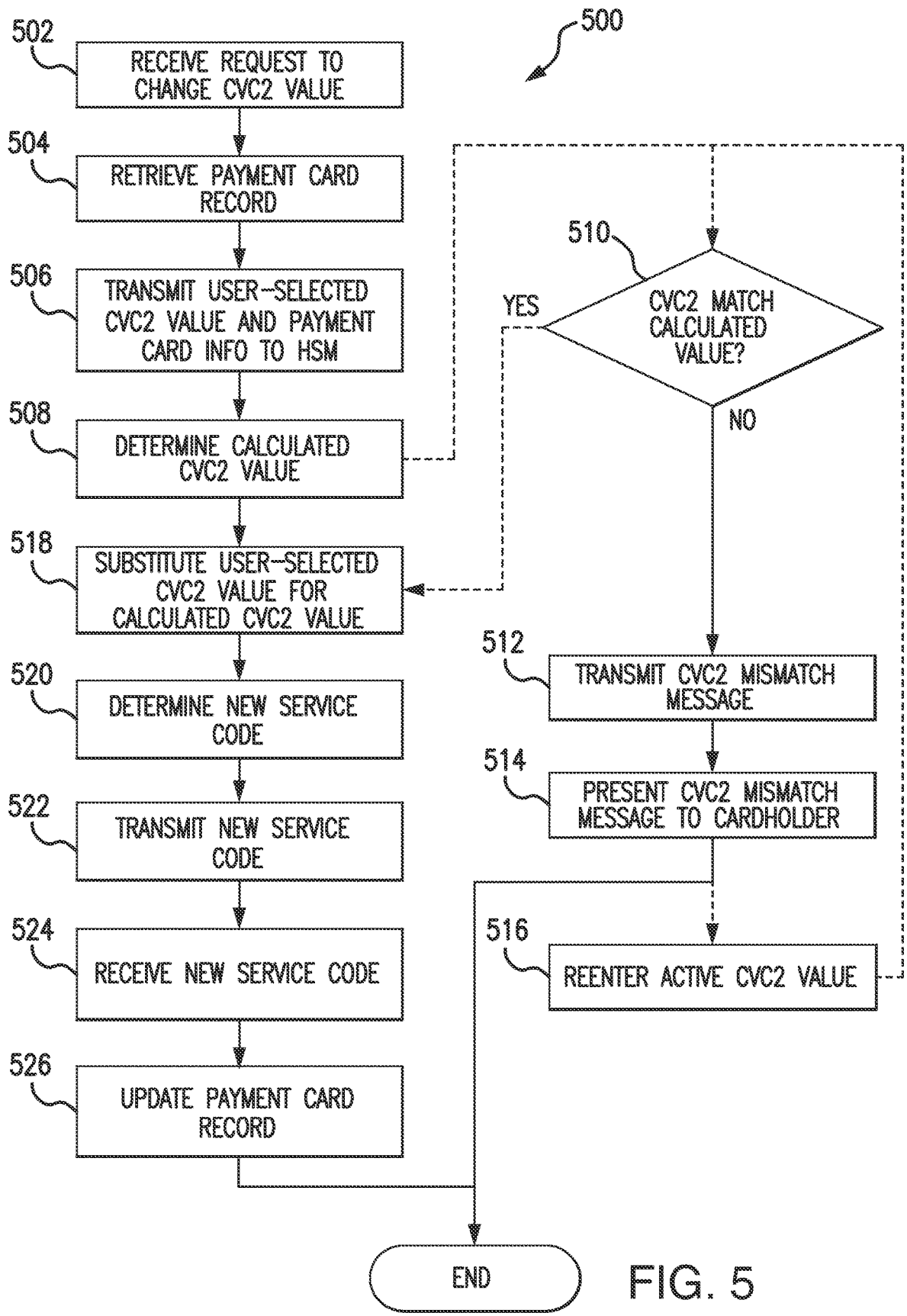
FIG. 5 is a flowchart illustrating an exemplary computer-implemented method for managing a user-selected CVC2 value for a payment card associated with a user, such as the cardholder shown in FIG. 1, in accordance with one embodiment of the present disclosure.

FIG. 5 is a flowchart illustrating an exemplary computer-implemented method 500 for managing a user-selected CVC2 value for a payment card, such as the payment card 30, associated with a user, such as the cardholder 22 (each shown in FIG. 1), in accordance with one embodiment of the present disclosure. The operations described herein may be performed in the order shown in FIG. 5 or, according to certain inventive aspects, may be performed in a different order. Furthermore, some operations may be performed concurrently as opposed to sequentially. In addition, some operations may be optional.

The computer-implemented method 500 is described below, for ease of reference, as being executed by exemplary devices and components introduced with the embodiments illustrated in FIGS. 1-4. In one embodiment, the computer-implemented method 500 may be implemented by the issuer 18 (shown in FIG. 1) using a computing device, such as the server system 400 (shown in FIG. 4). In the exemplary embodiment, the computer-implemented method 500 relates to managing a user-selected CVC2 value for a payment card associated with the cardholder. While operations within the computer-implemented method 500 are described below regarding the server systems 400, the computer-implemented method 500 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, a user, such as the cardholder 22 (shown in FIG. 2), has the payment card 30 issued to them by the issuer 18. The cardholder 22 may access account information associated with the payment card 30 by setting up an online user account with the issuer 18 (i.e., the issuing bank), for example, via an online banking application. The online banking application allows the cardholder 22 to accesses the user's account information, edit account preferences (e.g. change or reset an account PIN, change or reset the payment card CVC2 value, add or remove authorized users, activate or deactivate the associated payment card, etc.), and check transactions made using the account. When setting up the online user account, the cardholder 22 interacts with the user computing device 44 by way of at least one of a mobile banking application or a web site hosting the banking application. The cardholder 22 enters user data into the user account, wherein the user data facilitates authenticating the cardholder 22 and becomes linked with the specific user account. As such, when the cardholder 22 logs into the banking application, the cardholder may be automatically authenticated. In some embodiments, the cardholder 22 may be requested to enter additional information to authenticate the cardholder before performing certain operations, such as changing or updating an account PIN or payment card CVC2 value.

After logging into the banking application, the cardholder 22 may request a change to the CVC2 value of the payment card 30. For example, and without limitation, the cardholder 22 may click a link or press an icon that presents to the cardholder 22 a CVC2 change request page. In one example, the CVC2 change request page has an input field where the cardholder 22 enters a user-selected CVC2 to submit to the issuer 18 along with the change request. Optionally, in some embodiments, the CVC2 change request page may also have an input field for submitting the active CVC2 value of the payment card 30 along with the change request and/or user-selected CVC2 value.

At operation 502, the issuer 18 receives, via the CVC2 management system 34 (shown in FIG. 1), the request from the cardholder 22 to change the active CVC2 value associated with the payment card 30 to the user-selected CVC2 value. As described above, the request includes the user-selected CVC2 value. At operation 504, based upon the request, the CVC2 management server 36 retrieves from the payment card table 48 a payment card record, such as one of the payment card records $R_1$, $R_2$, or $R_3$, associated with the payment card 30. As described above and shown in Table 1, the payment card record includes a PAN, a payment card expiry date, and at least an active service code. At operation 506, the CVC2 management server 36 transmits the user-selected CVC2 value received via the cardholder request, and the PAN, expiry date, and active service code retrieved from the payment card record to the HSM 38 (shown in FIG. 2). In embodiments where the request included the active CVC2 value, the CVC2 management server 36 also transmits the active CVC2 value to the HSM 38.

At operation 508, the HSM 38 determines, using the code generation algorithm 46, a calculated CVC2 value based upon the received PAN, expiry date, active service code, and the secret cryptographic keys $K_1$ and $K_2$ associated with the payment card 30. As described above, the server system 400 is representative of the HSM 38 and includes a storage device 410 and a cryptographic processor 402 coupled to the storage device 410. The storage device 410 includes the secret cryptographic keys $K_1$ and $K_2$ associated with the payment card 30 and code generation algorithm 46 stored thereon.

Optionally, at operation 510, the HSM 38 compares the received active CVC2 value to the calculated CVC2 value. If the active CVC2 value does not match the calculated CVC2 value, at operation 512 the HSM 38 transmits a CVC mismatch message to the CVC2 management server 36. At operation 514, the CVC2 management server 36 presents the CVC mismatch message to the cardholder 22. For example, and without limitation, the CVC mismatch message may be transmitted to the user computing device 44 and presented to the cardholder 22 via the media output component 308. In instances where the user computing device 44 is a mobile device, the CVC mismatch message may be displayed when the mobile device is in an unlocked or locked state and may cause additional sensory alerts to be executed by mobile device (e.g., an audible and/or tactile alert may accompany the CVC mismatch message, etc.).

In some suitable embodiments, the cardholder 22 may interact with the CVC mismatch message and proceed to resubmit an active CVC2 value, as indicated at operation 516. The cardholder 22 may, for instance, be prompted to reenter the active CVC2 value of the payment card 30 or other cardholder identifying information, which may be transmitted to the CVC2 management server 36. In some instances, the cardholder 22 may be notified that a temporary hold is placed on the account via the user computing device 44 (e.g., via a mobile application configured to receive the CVC mismatch message).

If the first CVC2 value matches the calculated CVC2 value, or if the comparison operation 510 is not being performed by the HSM 38, the HSM 38 substitutes the user-selected CVC2 for the calculated first CVC2 value as indicated at operation 518. In particular, the portion of the ciphertext, which was generated by the encryption of the concatenated PAN, payment card expiry date, and service code using the cryptographic keys $K_1$ and $K_2$, as described above, that is used to generate the CVC2 value is replaced with the user-selected CVC2 value to generate a new ciphertext.

At operation 520, the new ciphertext is unencrypted using the reversible code generation algorithm 46 to determine a new service code (also referred to herein as a second service code). For example, the result of unencrypting the new ciphertext produces a concatenated string that includes the PAN of the payment card 30, the payment card expiry date, and the new service code. At operation 522 the new service code is transmitted by the HSM 38 to the CVC2 management server 36.

At operation 524, the CVC2 management server 36 receives from the HSM 38 the new service code (i.e., the second service code), and at operation 526, replaces or updates the active service code in the payment card record, such as one of the payment card records $R_1$, $R_2$, or $R_3$, to the new service code. For example, the CVC2 management server 36 overwrites the active service code with the new service code received from the HSM 38, thereby making the new service code the active service code for the payment card 30. As such, subsequent use of the payment card 30 in CNP transactions will require that the cardholder 22 submit the user-selected CVC2 value during the transaction.

Figure 6:
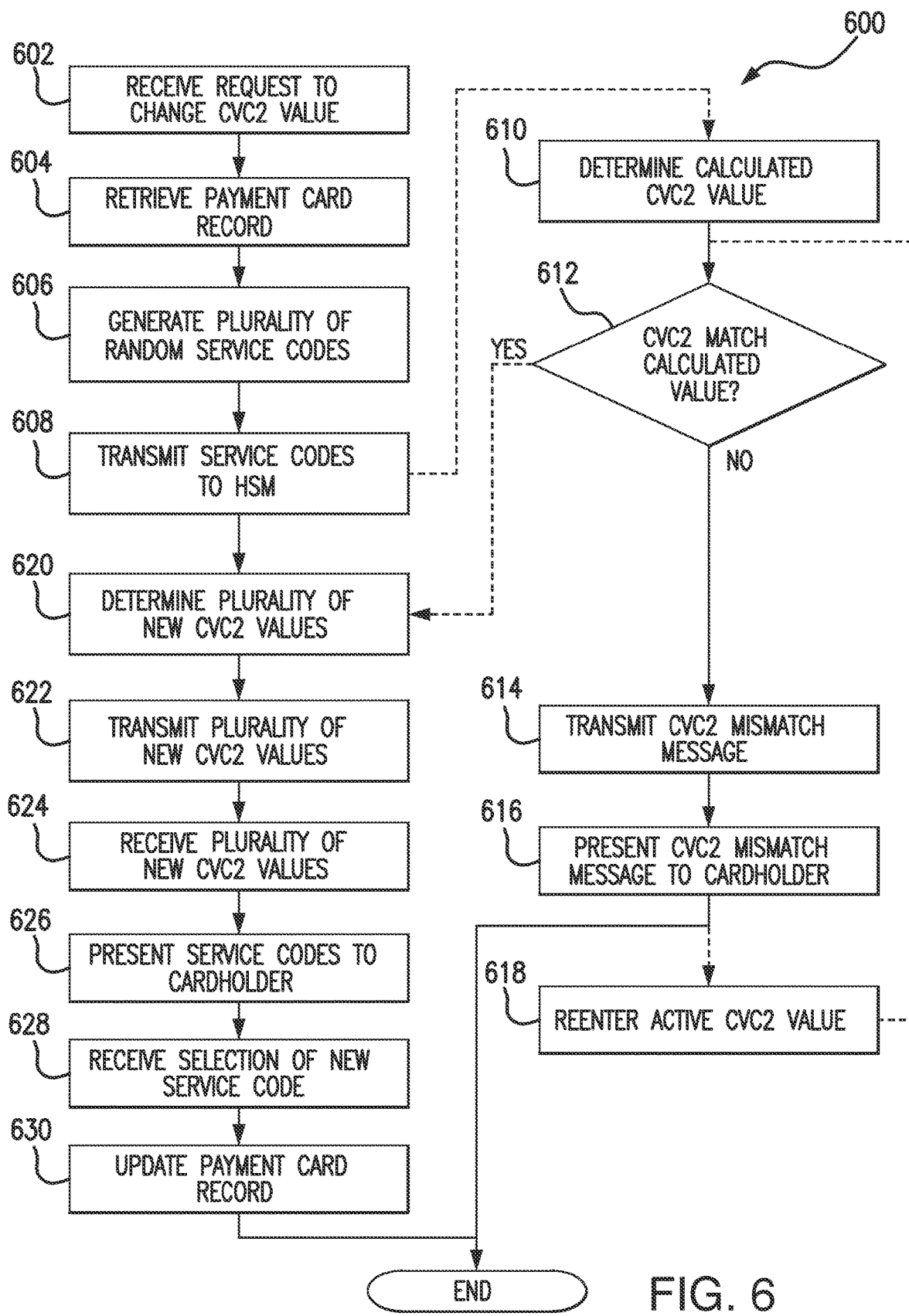
FIG. 6 is a flowchart illustrating another exemplary computer-implemented method for managing a user-selected CVC2 value for a payment card associated with a user, such as the cardholder shown in FIG. 1, in accordance with another embodiment of the present disclosure.

FIG. 6 is a flowchart illustrating an exemplary computer-implemented method 600 for managing a user-selected CVC2 value for a payment card, such as the payment card 30, associated with a user, such as the cardholder 22 (each shown in FIG. 1), in accordance with another embodiment of the present disclosure. The operations described herein may be performed in the order shown in FIG. 6 or, according to certain inventive aspects, may be performed in a different order. Furthermore, some operations may be performed concurrently as opposed to sequentially. In addition, some operations may be optional.

The computer-implemented method 600 is described below, for ease of reference, as being executed by exemplary devices and components introduced with the embodiments illustrated in FIGS. 1-4. In one embodiment, the computer-implemented method 600 may be implemented by the issuer 18 (shown in FIG. 1) using a computing device, such as the server system 400 (shown in FIG. 4). In the exemplary embodiment, the computer-implemented method 600 relates to managing a user-selected CVC2 value for a payment card associated with the cardholder. While operations within the computer-implemented method 600 are described below regarding the server systems 400, the computer-implemented method 600 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s)

may instruct the processor or processing units to perform additional, fewer, or alternative actions, including those discussed elsewhere herein.

In the embodiment illustrated in FIG. 6, a user, such as the cardholder 22 (shown in FIG. 2), sets up an online account with the issuer 18 to access account information associated with the payment card 30. After logging into the banking application, the cardholder 22 may request a change to the CVC2 value of the payment card 30. For example, and without limitation, the cardholder 22 may click a link or press an icon that transmits a CVC2 change request to the issuer 18, and in particular, to the CVC2 management system 34.

At operation 602, the issuer 18 receives, via the CVC2 management system 34 (shown in FIG. 1), the request from the cardholder 22 to change the active CVC2 value associated with the payment card 30. At operation 604, based upon the request, the CVC2 management server 36 retrieves from the payment card table 48 a payment card record, such as one of the payment card records $R_1$, $R_2$, or $R_3$, associated with the payment card 30. As described above and shown in Table 1, the payment card record includes a PAN, a payment card expiry date, and at least an active service code.

At operation 606, using the pseudo-random number generator application 50, the CVC2 management server 36 generates a plurality of random service codes (e.g., second service codes) for use in determining a plurality of CVC2 values. It is noted that each of the random service codes is different than the active service code and the default service code. As such, each generated new CVC2 value should be different than a current and default CVC2 value. At operation 608, the CVC2 management server 36 transmits the generated random service codes and the PAN, expiry date, and active service code retrieved from the payment card record to the HSM 38 (shown in FIG. 2). In embodiments where the request includes the active CVC2 value, the CVC2 management server 36 also transmits the active CVC2 value to the HSM 38.

Optionally, at operation 610, the HSM 38 determines, using the code generation algorithm 46, a calculated CVC2 value based upon the received PAN, expiry date, active service code, and the secret cryptographic keys $K_1$ and $K_2$ associated with the payment card 30. As described above, the server system 400 is representative of the HSM 38 and includes a storage device 410 and a cryptographic processor 402 coupled to the storage device 410. The storage device 410 includes the secret cryptographic keys $K_1$ and $K_2$ associated with the payment card 30 and code generation algorithm 46 stored thereon.

Optionally, at operation 612, the HSM 38 compares the received active CVC2 value to the calculated CVC2 value. If the active CVC2 value does not match the calculated CVC2 value, at operation 614 the HSM 38 transmits a CVC mismatch message to the CVC2 management server 36. At operation 616, the CVC2 management server 36 presents the CVC mismatch message to the cardholder 22. For example, and without limitation, the CVC mismatch message may be transmitted to the user computing device 44 and presented to the cardholder 22 via the media output component 308. In instances where the user computing device 44 is a mobile device, the CVC mismatch message may be displayed when the mobile device is in an unlocked or locked state and may cause additional sensory alerts to be executed by mobile device (e.g., an audible and/or tactile alert may accompany the CVC mismatch message, etc.).

In some suitable embodiments, the cardholder 22 may interact with the CVC mismatch message and proceed to resubmit an active CVC2 value, as indicated at operation 618. The cardholder 22 may, for instance, be prompted to reenter the active CVC2 value of the payment card 30 or other cardholder identifying information, which may be transmitted to the CVC2 management server 36. In some instances, the cardholder 22 may be notified that a temporary hold is placed on the account via the user computing device 44 (e.g., via a mobile application configured to receive the CVC mismatch message).

If the first CVC2 value matches the calculated CVC2 value, or if the comparison operation 612 is not being performed by the HSM 38, the HSM 38 determines a plurality of new CVC2 values using the received random service codes as indicated at operation 620. For example, and without limitation, the HSM 38 concatenates the PAN, the payment card expiry date, and one of the random service codes, and hashes the concatenated string under one or more cryptographic keys, such as the cryptographic keys $K_1$ and $K_2$. This operation is repeated until each of the received random service codes is used to generate a new CVC2 value. At operation 622, each of the new CVC2 values is transmitted by the HSM 38 to the CVC2 management server 36.

At operation 624, the CVC2 management server 36 receives from the HSM 38 the new CVC2 values (i.e., the second CVC2 values), each being associated with one of the random service codes. As indicated at operation 626, the new CVC2 values are presented to the cardholder 22, for example, via the media output component 308. The cardholder 22 is prompted to select one of the presented new CVC2 values from the list, and at operation 628, the CVC2 management server 36 receives the selection of one of the plurality of new CVC2 values.

At operation 630, the CVC2 management server 36 replaces or updates the active service code in the payment card record, such as one of the payment card records $R_1$, $R_2$, or $R_3$, to the new service code that is associated with the user-selected CVC2 value. For example, the CVC2 management server 36 overwrites the active service code with the new service code, thereby making the new service code the active service code for the payment card 30. As such, subsequent use of the payment card 30 in CNP transactions will require that the cardholder 22 submit the user-selected CVC2 value during the transaction.

Figure 7:
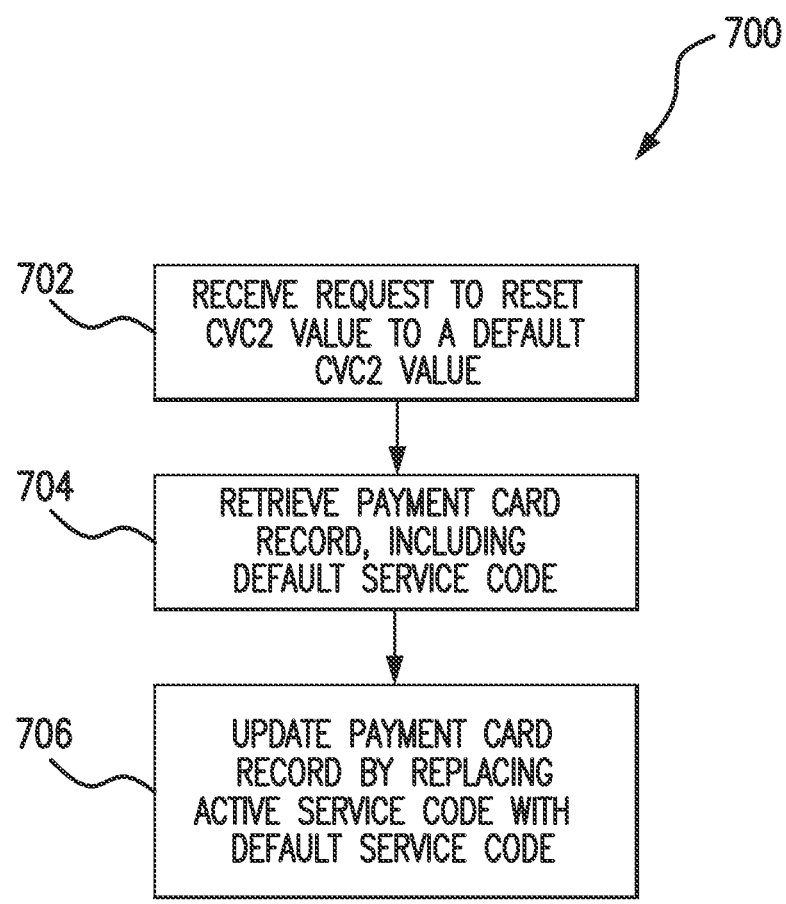
FIG. 7 is a flowchart illustrating an exemplary computer-implemented method for resetting a user-selected CVC2 value to a default CVC2 value for a payment card associated with a user, such as the cardholder shown in FIG. 1, in accordance with one embodiment of the present disclosure.

FIG. 7 is a flowchart illustrating an exemplary computer-implemented method 700 for resetting a user-selected CVC2 value to a default CVC2 value for a payment card, such as the payment card 30, associated with a user, such as the cardholder 22 (each shown in FIG. 1), in accordance with one embodiment of the present disclosure. The operations described herein may be performed in the order shown in FIG. 7 or, according to certain inventive aspects, may be performed in a different order. Furthermore, some operations may be performed concurrently as opposed to sequentially. In addition, some operations may be optional.

The computer-implemented method 700 is described below, for ease of reference, as being executed by exemplary devices and components introduced with the embodiments illustrated in FIGS. 1-4. In one embodiment, the computer-implemented method 700 may be implemented by the issuer 18 (shown in FIG. 1) using a computing device, such as the server system 400 (shown in FIG. 4). In the exemplary embodiment, the computer-implemented method 700 relates to resetting a user-selected CVC2 value to a default CVC2 value for a payment card associated with the cardholder. While operations within the computer-implemented method 700 are described below regarding the server systems 400, the computer-implemented method 700 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the embodiment illustrated in FIG. 7, a user, such as the cardholder 22 (shown in FIG. 2), sets up an online account with the issuer 18 to access account information associated with the payment card 30. After logging into the banking application, the cardholder 22 may change the CVC2 value of the payment card 30. For example, and without limitation, one or more of the methods 500 and 600 may be performed to define a user-selected CVC2 value for the payment card 30. Should the cardholder 22 forget the user-selected CVC2 value, or otherwise need to change the user-selected CVC2 value back to the default CVC2 value printed on the payment card 30, the reset method described below may be performed.

At operation 702, the issuer 18 receives, via the CVC2 management system 34, a reset request from the cardholder 22 to reset the active CVC2 value to the original or default CVC2 value. Upon receiving the request, at operation 704, the CVC2 management server 36 retrieves from the payment card table 48 a payment card record, such as one of the payment card records $R_1$, $R_2$, or $R_3$, associated with the payment card 30. As described above and shown in Table 1, the payment card record includes the PAN, expiry date, and at least an active service code and a default service code. At operation 706, the CVC2 management server 36 replaces or updates the active service code in the payment card record, such as one of the payment card records $R_1$, $R_2$, or $R_3$, to the default service code stored in the payment card record. For example, the CVC2 management server 36 overwrites the active service code with the default service code, thereby making the default service code the active service code for the payment card 30. As such, subsequent use of the payment card 30 in CNP transactions will require that the cardholder 22 submit the CVC2 value printed on the payment card 30 during the transaction.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated, unless so stated and/or except as will be readily apparent to those skilled in the art from the description. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A method for managing a user-selected card verification code (CVC2) value for a payment card associated with a user, said method comprising:

receiving, by a server, a request from the user via a user computing device to change a first CVC2 value associated with the payment card to the user-selected CVC2 value;

based upon the request, retrieving, by the server from a payment card table a payment card record associated with the payment card, the payment card record comprising a primary account number, a payment card expiry date, and a first service code;

generating, by the server, a plurality of second service codes;

transmitting, by the server, the primary account number, the payment card expiry date, and the plurality of second service codes to a hardware security module;

receiving, by the server from the hardware security module, a plurality of second CVC2 values, each second CVC2 value being different than the first CVC2 value and associated with a respective one of the second service codes;

presenting, by the server to the user via the user computing device, the plurality of second CVC2 values;

receiving, from the user computing device, a selection of one of the plurality of second CVC2 values, the selection of one of the plurality of second CVC2 values being the user-selected CVC2 value; and updating the first service code in the payment card record to the second service code associated with the user-selected CVC2 value, the hardware security module comprising a storage device and a cryptographic processor coupled to the storage device, the storage device having one or more cryptographic keys associated with the payment card and code generation algorithm stored thereon, said method further comprising:

determining, by the hardware security module using the code generation algorithm, the plurality of second CVC2 values, each second CVC2 value determined by the code generation algorithm based upon the primary account number, the payment card expiry date, a respective one of the plurality of second service codes, and the one or more cryptographic keys associated with the payment card; and transmitting the plurality of second CVC2 values and the associated respective second service codes.

2. The method in accordance with claim 1,
the code generation algorithm stored on the storage device of the hardware security module comprising a reversible code generation algorithm.

3. The method in accordance with claim 1,
said method further comprising:
receiving from the user the first CVC2 value associated with the payment card;
transmitting, to the hardware security module, the first service code;

determining, by the hardware security module using a code generation algorithm, a calculated CVC2 value based upon the primary account number, the payment card expiry date, the first service code, and the one or more cryptographic keys associated with the payment card;

comparing the received first CVC2 value to the calculated CVC2 value;

determining that the first CVC2 value matches the calculated CVC2 value;

based on the determination that the first CVC2 value matches the calculated CVC2 value, determining the plurality of second CVC2 values, each second CVC2 value based upon the primary account number, the payment card expiry date, a respective one of the plurality of second service codes, and the one or more cryptographic keys associated with the payment card; and transmitting the plurality of second CVC2 values and the associated respective second service codes.

4. The method in accordance with claim 3, the code generation algorithm stored on the storage device of the hardware security module comprising a reversible code generation algorithm.

5. The method in accordance with claim 1, further comprising:

receiving from the user the first CVC2 value associated with the payment card;

transmitting, to the hardware security module, the first service code;

determining, by the hardware security module using a code generation algorithm, a calculated CVC2 value based upon the primary account number, the payment card expiry date, the first service code, and the one or more cryptographic keys associated with the payment card;

comparing the received first CVC2 value to the calculated CVC2 value;

determining that the first CVC2 value does not match the calculated CVC2 value; and based on the determination that the first CVC2 value does not match the calculated CVC2 value, transmitting a CVC mismatch message.

6. The method in accordance with claim 5, further comprising presenting the CVC mismatch message to the user.

7. The method in accordance with claim 5, the code generation algorithm stored on the storage device of the hardware security module comprising a reversible code generation algorithm.

8. A system comprising:

a database having a payment card table therein, the payment card table including a payment card record associated with a payment card, the payment card record comprising a primary account number, a payment card expiry date, and a first service code;

a hardware security module receiving a plurality of second service codes, the primary account number, and the payment card expiry date, and transmitting a plurality of second CVC2 values;

a memory device; and a server coupled to the database and the hardware security module, the server comprising a processor coupled to said memory device, said memory device storing first computer-executable instructions that when executed by said processor, cause said processor to:

receive a request from a user computing device to change a first CVC2 value associated with the payment card to a user-selected CVC2 value;

based upon the request, retrieve from the payment card table the payment card record associated with the payment card;

generate the plurality of second service codes;

transmit the primary account number, the payment card expiry date, and the plurality of second service codes to the hardware security module;

receive, from the hardware security module, the plurality of second CVC2 values, each second CVC2 value being different than the first CVC2 value and associated with a respective one of the second service codes;

present, to the user computing device, the plurality of second CVC2 values;

receive, from the user computing device, a selection of one of the plurality of second CVC2 values, the selection of one of the plurality of second CVC2 values being the user-selected CVC2 value; and update the first service code in the payment card record to the second service code associated with the user-selected CVC2 value.

9. The system in accordance with claim 8, said hardware security module further comprising a storage device and a cryptographic processor coupled to the storage device, said storage device having second computer-executable instructions, one or more cryptographic keys associated with the payment card, and a code generation algorithm stored thereon, the second computer-executable instructions, when executed by the cryptographic processor, cause the cryptographic processor to:

determine, by the hardware security module using the code generation algorithm, the plurality of second CVC2 values, each second CVC2 value determined by the code generation algorithm based upon the primary account number, the payment card expiry date, a respective one of the plurality of second service codes, and the one or more cryptographic keys associated with the payment card; and transmit the plurality of second CVC2 values and the associated respective second service codes.

10. The system in accordance with claim 9, the code generation algorithm stored on the storage device of the hardware security module comprising a reversible code generation algorithm.

11. The system in accordance with claim 8, the hardware security module comprising a storage device and a cryptographic processor coupled to the storage device, the storage device having third computer-executable instructions, one or more cryptographic keys associated with the payment card, and a code generation algorithm stored thereon, the third computer-executable instructions, when executed by the cryptographic processor, cause the cryptographic processor to:

receive from the user computing device the first CVC2 value associated with the payment card;

receive the first service code;

determine, using a code generation algorithm, a calculated CVC2 value based upon the primary account number, the payment card expiry date, the first service code, and the one or more cryptographic keys associated with the payment card;

compare the received first CVC2 value to the calculated CVC2 value;
determine that the first CVC2 value does not match the calculated CVC2 value; and
transmit a CVC mismatch message.

12. The system in accordance with claim 11,
the code generation algorithm stored on the storage device of the hardware security module comprising a reversible code generation algorithm.

13. The system in accordance with claim 11,
the first computer-executable instructions, when executed by the processor further cause said processor to present the CVC mismatch message to a user via the user computing device.

14. The system in accordance with claim 8,
the hardware security module comprising a storage device and a cryptographic processor coupled to the storage device,
the storage device having fourth computer-executable instructions, one or more cryptographic keys associated with the payment card, and a code generation algorithm stored thereon, the fourth computer-executable instructions, when executed by the cryptographic processor, cause the cryptographic processor to:
receive from the user computing device the first CVC2 value associated with the payment card;
receive the first service code;
determine, using a code generation algorithm, a calculated CVC2 value based upon the primary account number, the payment card expiry date, the first service code, and the one or more cryptographic keys associated with the payment card;
compare the received first CVC2 value to the calculated CVC2 value;
determine that the first CVC2 value matches the calculated CVC2 value;
based on the determination that the first CVC2 value matches the calculated CVC2 value, determine the plurality of second CVC2 values, each second CVC2 value based upon the primary account number, the payment card expiry date, a respective one of the plurality of second service codes, and the one or more cryptographic keys associated with the payment card; and
transmit the plurality of second CVC2 values and the associated respective second service codes.

15. The system in accordance with claim 14,
the code generation algorithm stored on the storage device of the hardware security module comprising a reversible code generation algorithm.

* * * * *